United States Patent
Ramanna et al.

(10) Patent No.: US 9,609,458 B2
(45) Date of Patent: Mar. 28, 2017

(54) MOBILE RADIO COMMUNICATION DEVICES, SERVERS, METHODS FOR CONTROLLING A MOBILE RADIO COMMUNICATION DEVICE, AND METHODS FOR CONTROLLING A SERVER

(71) Applicant: Intel IP Corporation, Santa Clara, CA (US)

(72) Inventors: Vivek Ramanna, Santa Clara, CA (US); Juergen Kreuchauf, San Francisco, CA (US); Robert Zaus, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/495,909

(22) Filed: Sep. 25, 2014

(65) Prior Publication Data

US 2016/0094930 A1 Mar. 31, 2016

(51) Int. Cl.
*H04M 1/00* (2006.01)
*H04W 4/00* (2009.01)
(Continued)

(52) U.S. Cl.
CPC .......... *H04W 4/001* (2013.01); *H04B 1/3816* (2013.01); *H04W 8/205* (2013.01);
(Continued)

(58) Field of Classification Search
USPC .......... 455/558, 411, 435.1, 433, 406, 414.1, 455/418, 405
See application file for complete search history.

(56) References Cited

U.S. PATENT DOCUMENTS

2007/0135078 A1* 6/2007 Ljung ................. H04B 5/0037
455/343.1
2010/0167692 A1* 7/2010 Haynes ............... H04L 63/0428
455/410
(Continued)

FOREIGN PATENT DOCUMENTS

CN 102917339 A 2/2013
EP 2461613 A1 6/2012
(Continued)

OTHER PUBLICATIONS

Extended European Search Report issued in the corresponding EP application No. 15182083.4 dated Feb. 9, 2016 (17 pages).
(Continued)

*Primary Examiner* — Charles Appiah
*Assistant Examiner* — Alexander Yi
(74) *Attorney, Agent, or Firm* — Viering, Jentschura & Partner mbB

(57) ABSTRACT

A mobile radio communication device is described comprising: an instruction receiver configured to receive an instruction from a second mobile radio communication device to request subscriber identity module installation data for installation of a second subscriber identity module, wherein the second subscriber identity module is related to a first subscriber identity module that is installed in the second mobile radio communication device; a request transmitter configured to transmit a request for the subscriber identity module installation data to a first server; a subscription data receiver configured to receive the subscriber identity module installation data from a second server; and a controller configured to install the second subscriber identity module based on the received subscriber identity module installation data.

19 Claims, 8 Drawing Sheets

(51) Int. Cl.
*H04W 8/20* (2009.01)
*H04B 1/3816* (2015.01)
*H04W 8/18* (2009.01)
*H04W 8/24* (2009.01)
*H04W 12/06* (2009.01)
*H04W 92/18* (2009.01)

(52) U.S. Cl.
CPC ............ *H04W 8/183* (2013.01); *H04W 8/245* (2013.01); *H04W 12/06* (2013.01); *H04W 92/18* (2013.01)

(56) References Cited

U.S. PATENT DOCUMENTS

| | | | |
|---|---|---|---|
| 2011/0281551 A1* | 11/2011 | Gonzalez | H04M 15/00 455/406 |
| 2011/0316723 A1* | 12/2011 | Wohlert | G06Q 10/10 341/20 |
| 2012/0117635 A1 | 5/2012 | Schell et al. | |
| 2014/0370806 A1* | 12/2014 | Atkinson | G06K 19/0717 455/41.1 |
| 2015/0148020 A1* | 5/2015 | Laden | H04W 12/06 455/418 |
| 2015/0215773 A1* | 7/2015 | Bai | H04W 8/183 455/418 |

FOREIGN PATENT DOCUMENTS

| | | |
|---|---|---|
| EP | 2680628 A1 | 1/2014 |
| GB | 2522044 A | 7/2015 |
| TW | 201234827 A1 | 8/2012 |
| WO | 2013140025 A1 | 9/2013 |

OTHER PUBLICATIONS

Taiwanese Office Action based on Application No. 104127008(4 Pages) dated Nov. 22, 2016 (Reference Purpose Only).

* cited by examiner

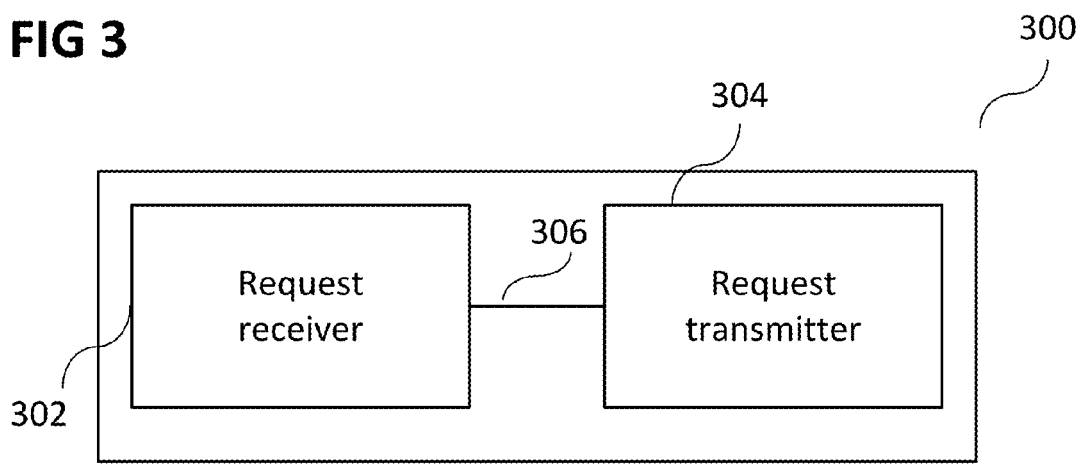
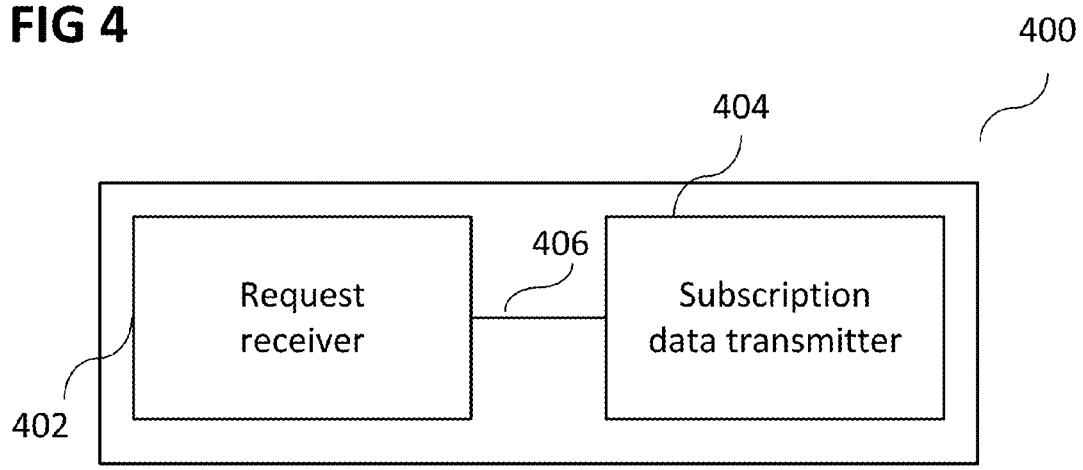
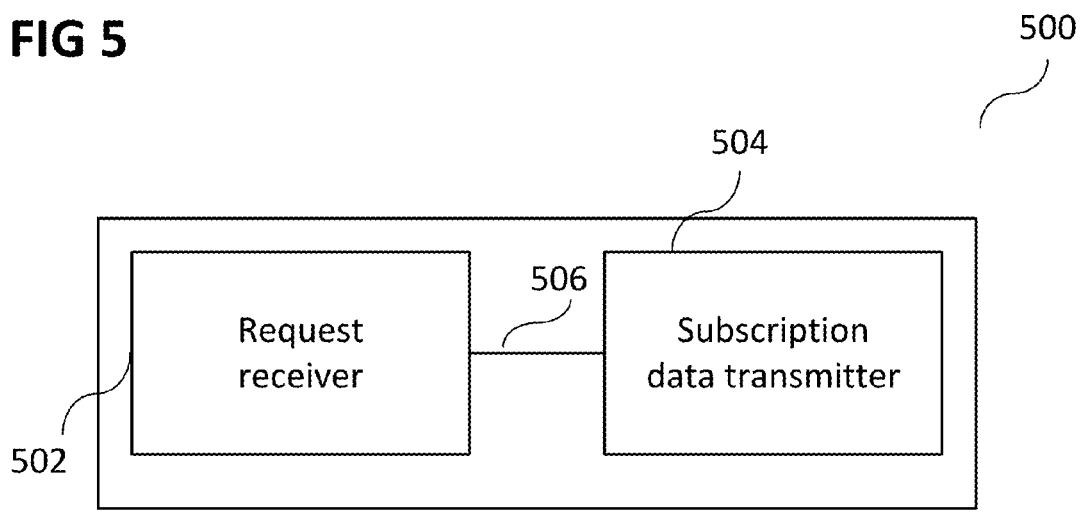

MOBILE RADIO COMMUNICATION DEVICES, SERVERS, METHODS FOR CONTROLLING A MOBILE RADIO COMMUNICATION DEVICE, AND METHODS FOR CONTROLLING A SERVER

TECHNICAL FIELD

The present disclosure generally relates to mobile radio communication devices, servers, methods for controlling a mobile radio communication device, and methods for controlling a server.

BACKGROUND

Today's mobile devices mostly being smart devices (smartphone, tablet and computer/Ultrabook) are equipped with a range of connectivity options. Thus, there may be a desire for efficiently handling these connectivity options.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects are described with reference to the following drawings, in which:

FIG. 3 shows a first server with a request receiver and a request transmitter.

FIG. 4 shows a second server with a request receiver and a subscription data transmitter.

FIG. 5 shows a server with a request receiver and a subscription data transmitter.

DESCRIPTION OF EMBODIMENTS

Figure 1:
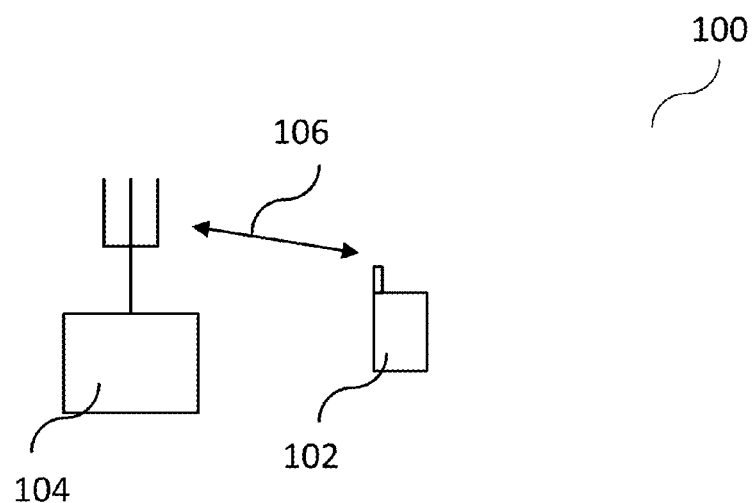
FIG. 1 shows a mobile radio communication system.

The following detailed description refers to the accompanying drawings that show, by way of illustration, specific details and aspects of this disclosure in which various aspects of this disclosure may be practiced. Other aspects may be utilized and structural, logical, and electrical changes may be made without departing from the scope of the various aspects of this disclosure. The various aspects of this disclosure are not necessarily mutually exclusive, as some aspects of this disclosure can be combined with one or more other aspects of this disclosure to form new aspects.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The mobile radio communication device may include a memory which may for example be used in the processing carried out by the mobile radio communication device. The server may include a memory which may for example be used in the processing carried out by the server. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a mobile radio communication system 100. A mobile radio communication device 102 may receive a signal from a base station 104, for example wirelessly like indicated by arrow 106. User credentials of the mobile radio communication device 102 (for example a user equipment (UE)) in a radio communication network (for example a 3GPP (3rd Generation Partnership Project) Mobile network), to which base station 104 belongs, may be stored on a subscriber identity module (SIM) of the mobile radio communication device 102.

UICC (Universal Integrated Circuit Card) may be a specific type of smart card used in mobile terminals compliant to the 3GPP standard (2G (second generation)/GSM (Global System for Mobile Communications), 3G (third generation)/UMTS (Universal Mobile Telecommunications System) and 4G (fourth generation)/LTE (Long Term Evolution) technologies). The UICC may securely store the SIM (Subscriber Identification Module) application, or USIM (UMTS Subscriber Identification Information) application which allows the UE (user equipment) to connect to a mobile network. The SIM may store the International Mobile Subscriber Identity (IMSI) and the related secure keys which may be used to identify and authenticate the subscribers on the network with the Mobile Device (e.g. a phone, tablet or computer/Ultrabook). The UICC may also contain several applications (Java Card Applets), making it possible for the same smart card to give access to both GSM and UMTS networks, and also provide storage of phone book and other applications. The UICC ensures the integrity and security of personal data, typically in a few hundred kilobytes.

Today's mobile devices mostly being smart devices (smartphone, tablet and computer/Ultrabook) are equipped with a range of connectivity options. With various radio communication devices on the smartphone such as NFC (Near Field Communication), Bluetooth, WiFi, etc. the smart devices are becoming a catalyst for Internet of Things (IoT). To enable a seamless and high-quality user experience, it is crucial to identify the user's persona securely associating this sensitive data with a particular device.

Today we have the following limitations in the usage of the current UICC and the mobile subscription on smart devices:

1) Mobile Network Operator (MNO) Subscription parameters and security credentials are hosted on the UICC via SIM application, and this application is specific to one particular MNO, thus limiting the mobile subscriber to connect only to that MNO's network.

2) When the mobile subscriber/user is roaming abroad, either the user has to incur hefty roaming charges or go to a store to purchase a local SIM card, thus having to manage multiple physical SIM cards and change accordingly.

3) Missing SIM card personalization. Current UICC for smart devices is limited in programming ability to remotely provision/activate (over the air) newer subscriptions or transfer subscriptions between devices.

4) The UICC is unable to communicate with other radio communication devices such as NFC.

5) No user access and control for subscription management for a specific UICC. (The mobile subscriber/user is only able to switch between multiple physical SIM cards; see 3.)

6) Missing network entity to manage multiple subscriptions & services on devices. (Currently, MNO's are regarding the UICC as their "property" and are not interested in supporting the subscriber in his wish to be able to manage multiple subscriptions on a single SIM).

According to various aspects of this disclosure, mobile subscription management, for example using NFC Tap and Activate application, may be provided.

Figure 2:
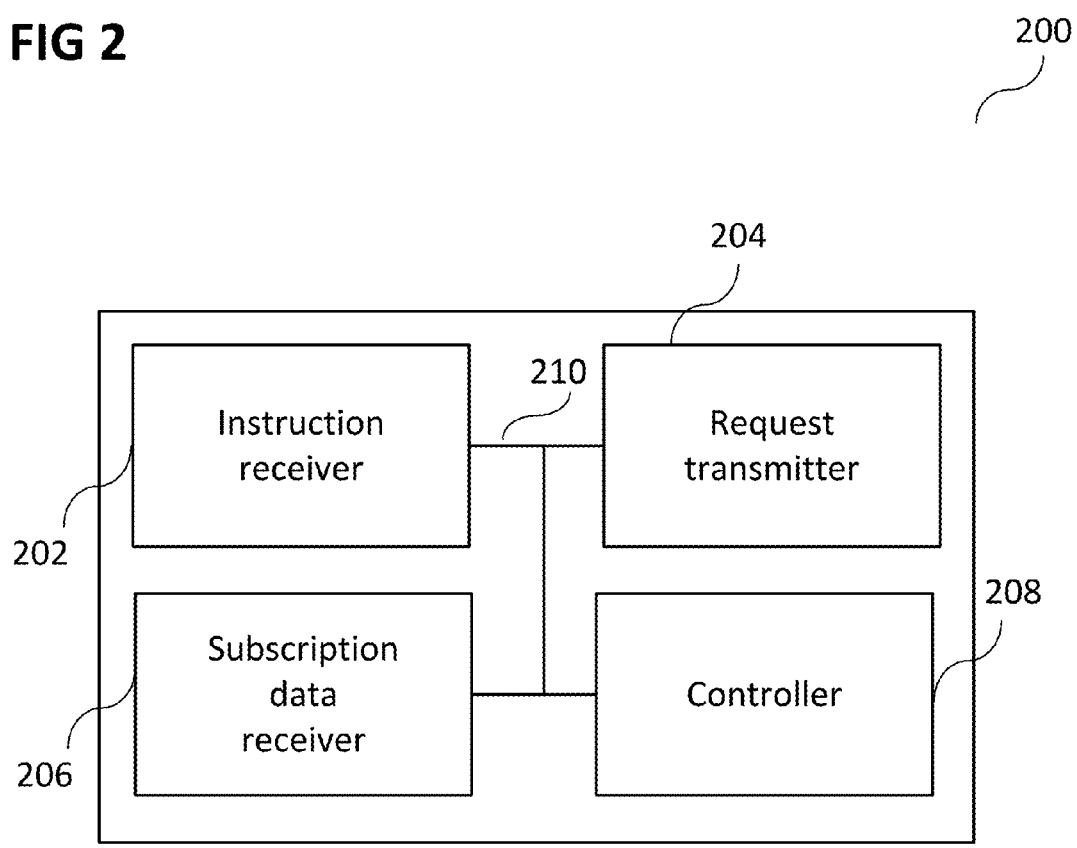
FIG. 2 shows a mobile radio communication device with an instruction receiver, a request transmitter, a subscription data receiver, and a controller.

FIG. 2 shows a mobile radio communication device 200 (which may be a secondary device, like will be described in more detail below). The mobile radio communication device 200 may include an instruction receiver 202 configured to receive an instruction from second mobile radio communication device (which may be a primary device, like will be described in more detail below) to request subscriber identity module installation data for installation of a second subscriber identity module. The second subscriber identity module may be related to a first subscriber identity module that is installed in the second mobile radio communication device. The mobile radio communication device 200 may further include a request transmitter 204 configured to transmit a request for the subscriber identity module installation data to a first server. The mobile radio communication device 200 may further include a subscription data receiver 206 configured to receive the subscriber identity module installation data from a second server. The mobile radio communication device 200 may further include a controller 208 configured to install the second subscriber identity module based on the received subscriber identity module installation data. The instruction receiver 202, the request transmitter 204, the subscription data receiver 206, and the controller 208 may be coupled with each other, for example via a connection 210, for example an optical connection or an electrical connection, such as for example a cable or a computer bus or via any other suitable electrical or electromagnetic connection to exchange signals.

In other words, the mobile radio communication device may, based on an instruction from another mobile radio communication device, request, receive and install data related to a subscriber identity mobile which is related to a subscriber identity module installed in the other mobile radio communication device.

It is to be noted that each mobile radio communication device may be getting its 'own' subscription, including an own International Mobile Subscriber Identity (IMSI), own security credentials (secret key), etc. . . . So the subscriber identity module (which may also be referred to as "subscription") installed in the second mobile radio communication device may be different from the subscription already stored in the first mobile radio communication device. But the two subscriptions may be 'related' to each other in so far as e.g. an Ultra-Mobility Server knows that they are belonging to the same mobile data plan.

Besides the primary and secondary device, a further device (which may be referred to as Master device) may be provided, like will be described in the following.

The primary device may be a device owned by the user that is capable of having the first subscription. For example, if the device itself does not have NFC capability, it may become the primary device by inserting an NFC card. This NFC Card may have the form factor and functionality of a legacy UICC card which additionally has NFC capability. So the NFC card may be plugged into the normal SIM slot of a smartphone device that may become the primary device and may be used to Tap and Activate secondary devices.

Alternatively, the primary device itself may already be equipped with an NFC chip and thus have NFC capability. In this case, it may be sufficient to insert a UICC card without NFC capability in the SIM slot. By using the first subscription of the data plan stored on the UICC card and the NFC capability of the device, the device may then act as a primary device.

The Master device may be a device owned by an operator or telecom shop owner that is capable to Tap and Activate a primary device. The Master device may include an NFC card with the form factor of a legacy UICC card. The UICC card may be storing a special subscription by which the Master device is enabled to turn e.g. a smartphone device into a primary device by tapping it and thus triggering the transfer of the first subscription of a data plan to the device.

I.e. the relationship between Master device and primary device may be similar to the relationship between primary device and secondary device, however, for example a primary device may only activate a small number of secondary devices (as limited by the data plan), whereas the Master device may activate a much bigger number of primary devices (limited e.g. by a contract between the telecom shop owner and the operator, and by the size of the 'pool' of subscriptions that is reserved on the Subscription Management Server for the Ultra-Mobility Server (like described below).

The second mobile radio communication device may include a short range receiver. Correspondingly, the first mobile radio communication device may include a short range transmitter so that it can signal a 'tap' to the second device.

It is to be noted that the second mobile radio communication device can receive data ("Server Response") from the Ultra-Mobility Server (UMS) (step 828 in FIG. 8), and later the actual subscription data (step 846) from the Subscription Management Server (SubMan), possibly via a different connection.

FIG. 3 shows a first server 300 (which may be an Ultra-Mobility Server, like will be described in more detail below). The first server 300 may include a request receiver 302 configured to receive from a second mobile radio communication device (for example like shown in FIG. 2) a request for subscriber identity module installation data for installation of a second subscriber identity module. The second subscriber identity module may be related to a first subscriber identity module that is installed in a first mobile radio communication device. The first server 300 may further include a request transmitter 304 configured to transmit to a second server (for example like shown in FIG. 4) a request to transmit the subscriber identity module installation data to the second mobile radio communication device. The request receiver 302 and the request transmitter 304 may be coupled with each other, for example via a connection 306, for example an optical connection or an electrical connection, such as for example a cable or a computer bus or via any other suitable electrical or electromagnetic connection to exchange signals.

In other words, the first server may receive a request for subscriber identity module installation data from a mobile radio communication device, and may transmit the request to another server.

FIG. 4 shows a second server 400 (which may be a Subscription Management Server, which may communicate with the Ultra-Mobility Server and with the device requesting for a subscription. The second server 400 may include a request receiver 402 configured to receive from a first server (for example like shown in FIG. 3) a request to transmit subscriber identity module installation data for installation of a first subscriber identity module to a first mobile radio communication device (for example like shown in FIG. 2). The second server 400 may further include a subscription data transmitter 404 configured to transmit the subscriber identity module installation data to the first mobile radio communication device. The request receiver 402 and the subscription data transmitter 404 may be coupled with each other, for example via a connection 406, for example an optical connection or an electrical connection, such as for example a cable or a computer bus or via any other suitable electrical or electromagnetic connection to exchange signals.

In other words, the second server may receive a request for subscriber identity module installation data from a first server, and may transmit the subscriber identity module installation data to a mobile radio communication device.

For example, the server may deliver the subscription data to a certain IP (Internet Protocol) address (="Addr 2") which was assigned to the secondary device when it attached to the network. This attach may have happened via a cellular mobile network—in which case the subscription data will be delivered via this mobile network (via a gateway to this mobile network); or it may have happened via a WLAN (wireless local area network)/packet data network—in which case the subscription data may be delivered via this packet data network (via a gateway to this packet data network). In both cases the direct interface of the subscription data transmitter may be to a packet data network.

FIG. 5 shows a server 500. The server 500 may include a request receiver 502 configured to receive from a second mobile radio communication device (for example like shown in FIG. 2) a request for subscriber identity module installation data for installation of a second subscriber identity module. The second subscriber identity module may be related to a first subscriber identity module that is installed in a first mobile radio communication device. The server 500 may further include a subscription data transmitter 504 configured to transmit the subscriber identity module installation data to the second mobile radio communication device. The request receiver 502 and the subscription data transmitter 504 may be coupled with each other, for example via a connection 506, for example an optical connection or an electrical connection, such as for example a cable or a computer bus or via any other suitable electrical or electromagnetic connection to exchange signals.

In other words, the server may receive a request for subscriber identity module installation data from a mobile radio communication device, and may transmit the subscriber identity module installation data to the mobile radio communication device.

Figure 6A:
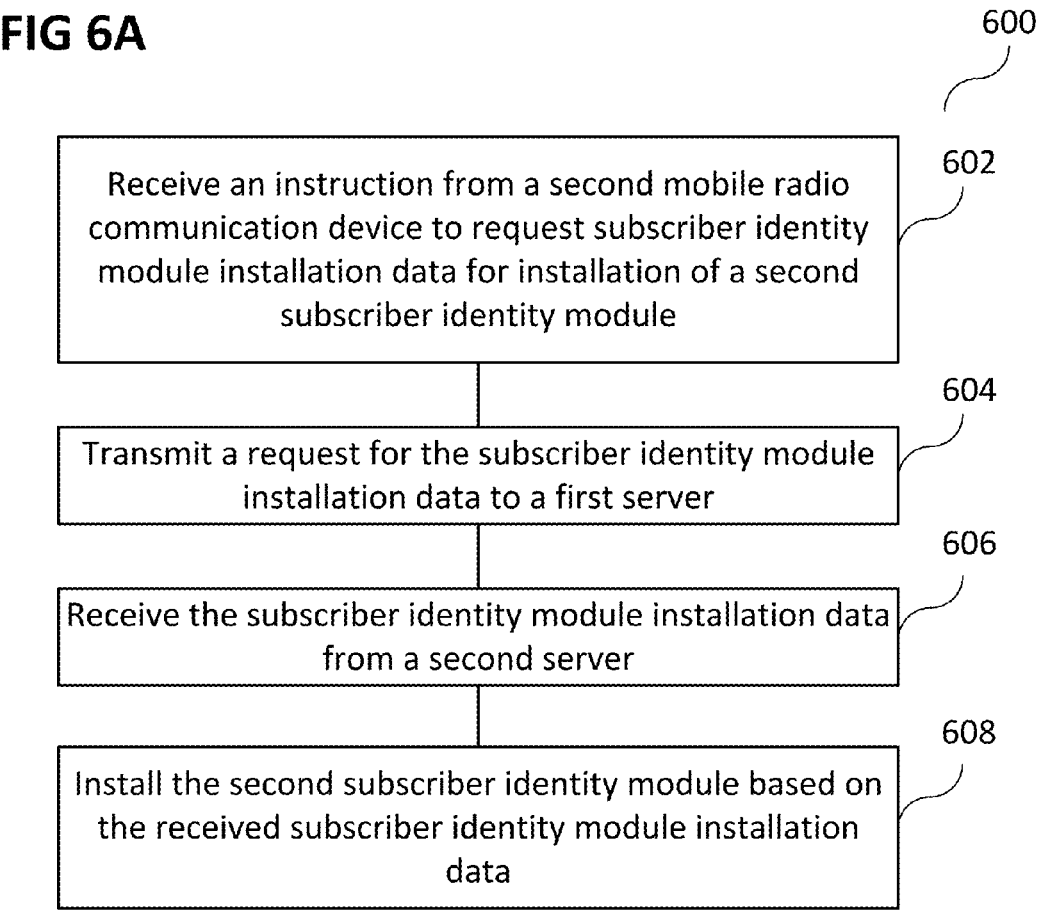
FIG. 6A shows a flow diagram illustrating a method for controlling a mobile radio communication device.

FIG. 6A shows a flow diagram 600 illustrating a method for controlling a mobile radio communication device. In 602, an instruction receiver of the mobile radio communication device may receive an instruction from a second mobile radio communication device to request subscriber identity module installation data for installation of a second subscriber identity module. The second subscriber identity module may be related to a first subscriber identity module that is installed in the second mobile radio communication device. In 604, a request transmitter of the mobile radio communication device may transmit a request for the subscriber identity module installation data to a first server. In 606, a subscription data receiver of the mobile radio communication device may receive the subscriber identity module installation data from a second server. In 608, a controller of the mobile radio communication device may install the second subscriber identity module based on the received subscriber identity module installation data.

Figure 6B:
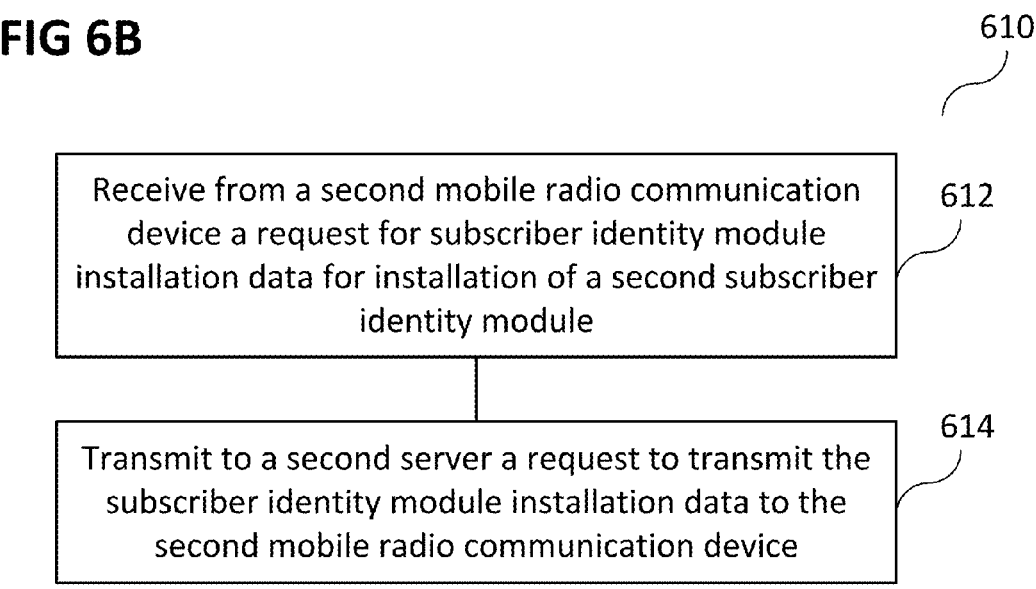
FIG. 6B shows a flow diagram illustrating a method for controlling a first server.

FIG. 6B shows a flow diagram 610 illustrating a method for controlling a first server. In 612, a request receiver of the first server may receive from a second mobile radio communication device a request for subscriber identity module installation data for installation of a second subscriber identity module. The second subscriber identity module may be related to a first subscriber identity module that is installed in a first mobile radio communication device. In 614, a request transmitter of the first server may transmit to a second server a request to transmit the subscriber identity module installation data to the second mobile radio communication device.

Figure 6C:
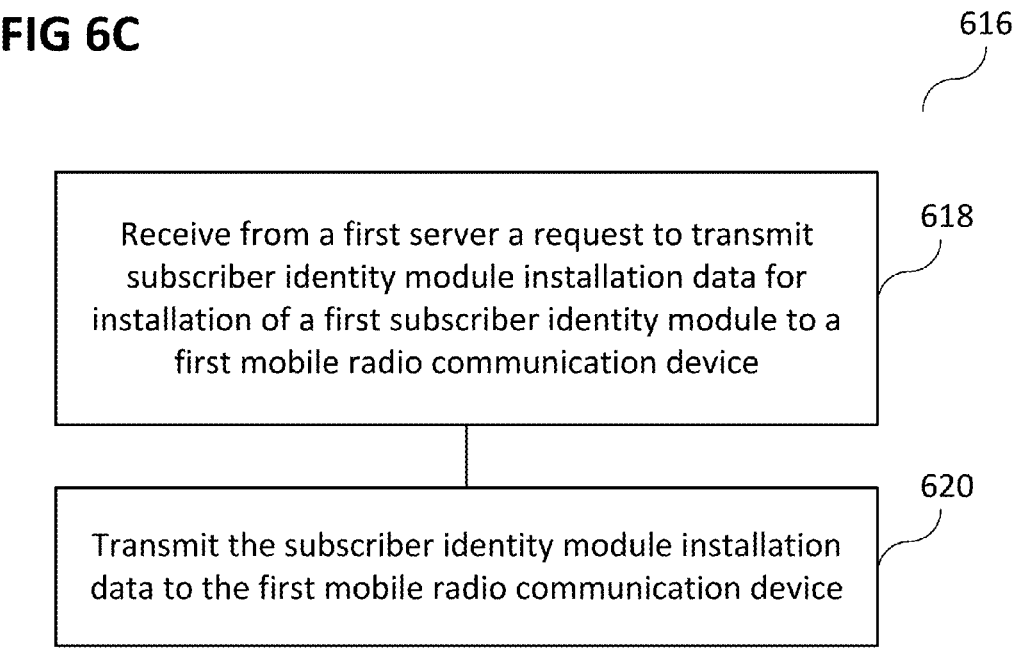
FIG. 6C shows a flow diagram illustrating a method for controlling a second server.

FIG. 6C shows a flow diagram 616 illustrating a method for controlling a second server. In 618, a request receiver of the second server may receive from a first server a request to transmit subscriber identity module installation data for installation of a first subscriber identity module to a first mobile radio communication device. In 620, a subscription data transmitter of the second server may transmit the subscriber identity module installation data to the first mobile radio communication device.

Figure 6D:
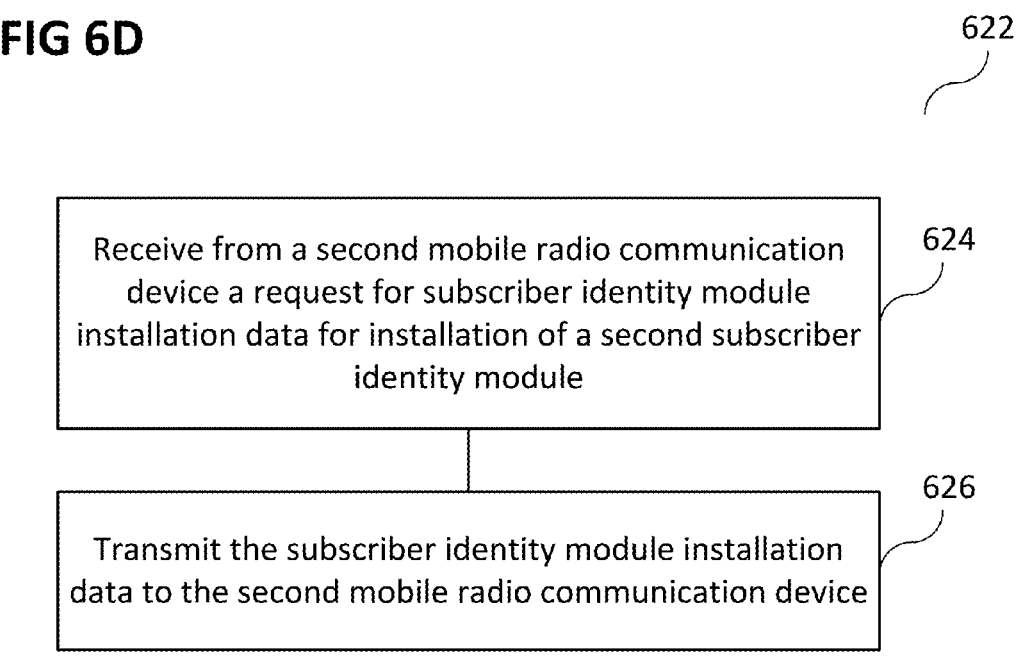
FIG. 6D shows a flow diagram illustrating a method for controlling a server.

FIG. 6D shows a flow diagram 622 illustrating a method for controlling a server. In 624, a request receiver of the server may receive from a second mobile radio communication device a request for subscriber identity module installation data for installation of a second subscriber identity module. The second subscriber identity module may be related to a first subscriber identity module that is installed in a first mobile radio communication device. In 626, a subscription data transmitter of the server may transmit the subscriber identity module installation data to the second mobile radio communication device.

The following examples pertain to further embodiments.

Example 1, as described with reference to FIG. 2, is a mobile radio communication device comprising: an instruction receiver configured to receive an instruction from a second mobile radio communication device to request subscriber identity module installation data for installation of a second subscriber identity module, wherein the second subscriber identity module is related to a first subscriber identity module that is installed in the second mobile radio communication device; a request transmitter configured to transmit a request for the subscriber identity module installation data to a first server; a subscription data receiver configured to receive the subscriber identity module installation data from a second server; and a controller configured to install the second subscriber identity module based on the received subscriber identity module installation data.

In Example 2, the subject matter of Example 1 can optionally include that the instruction receiver comprises a Near Field Communication receiver.

In Example 3, the subject matter of any one of Examples 1-2 can optionally include that the request transmitter comprises at least one of a cellular mobile radio communication transmitter, a WLAN transmitter, a transmitter of an ethernet card, a transmitter of an interface card, or a core network transmitter.

In Example 4, the subject matter of any one of Examples 1-3 can optionally include that the subscription data receiver comprises at least one of a cellular mobile radio communication receiver, a WLAN receiver, a receiver of an ethernet card, a receiver of an interface card, or a core network receiver.

In Example 5, the subject matter of any one of Examples 1-4 can optionally include a subscriber identity module circuit.

In Example 6, the subject matter of Example 5 can optionally include that the controller is configured to install the second subscriber identity module in the subscriber identity module circuit.

In Example 7, the subject matter of any one of Examples 1-6 can optionally include: a short range receiver configured to receive event data from the second mobile radio communication device; wherein the instruction receiver is configured to receive the instruction from the second mobile radio communication device based on the event data.

In Example 8, the subject matter of any one of Examples 1-7 can optionally include that the short range receiver comprises a Near Field Communication receiver.

In Example 9, the subject matter of any one of Examples 1-8 can optionally include that the second server comprises the first server.

In Example 10, the subject matter of any one of Examples 1-9 can optionally include: a processor; wherein the processor comprises the instruction receiver and the controller.

Example 11, as described with reference to FIG. 3, is a first server comprising: a request receiver configured to receive from a second mobile radio communication device a request for subscriber identity module installation data for installation of a second subscriber identity module, wherein the second subscriber identity module is related to a first subscriber identity module that is installed in a first mobile radio communication device; and a request transmitter configured to transmit to a second server a request to transmit the subscriber identity module installation data to the second mobile radio communication device.

In Example 12, the subject matter of Example 11 can optionally include that the request receiver comprises at least one of a cellular mobile radio communication receiver, a WLAN receiver, a receiver of an ethernet card, a receiver of an interface card, or a core network receiver.

In Example 13, the subject matter of any one of Examples 11-12 can optionally include that the request transmitter comprises a core network transmitter.

Example 14, as described with reference to FIG. 4, is a second server comprising: a request receiver configured to receive from a first server a request to transmit subscriber identity module installation data for installation of a first subscriber identity module to a first mobile radio communication device; and a subscription data transmitter configured to transmit the subscriber identity module installation data to the first mobile radio communication device.

In Example 15, the subject matter of Example 14 can optionally include that the first subscriber identity module is related to a second subscriber identity module that is installed in a second mobile radio communication device.

In Example 16, the subject matter of any one of Examples 14-15 can optionally include that the request receiver comprises a core network receiver.

In Example 17, the subject matter of any one of Examples 14-16 can optionally include that the subscription data transmitter comprises a core network transmitter.

Example 18, as described with reference to FIG. 5, is a server comprising: a request receiver configured to receive from a second mobile radio communication device a request for subscriber identity module installation data for installation of a second subscriber identity module, wherein the second subscriber identity module is related to a first subscriber identity module that is installed in a first mobile radio communication device; and a subscription data transmitter configured to transmit the subscriber identity module installation data to the second mobile radio communication device.

In Example 19, the subject matter of Example 18 can optionally include that the request receiver comprises at least one of a cellular mobile radio communication receiver, a WLAN receiver, a receiver of an ethernet card, a receiver of an interface card, or a core network receiver.

In Example 20, the subject matter of any one of Examples 18-19 can optionally include that the subscription data transmitter comprises a core network transmitter.

Example 21, as described with reference to FIG. 6A, is a method for controlling a mobile radio communication device, the method comprising: receiving an instruction from a second mobile radio communication device to request subscriber identity module installation data for installation of a second subscriber identity module, wherein the second subscriber identity module is related to a first subscriber identity module that is installed in the second mobile radio communication device; transmitting a request for the subscriber identity module installation data to a first server; receiving the subscriber identity module installation data from a second server; and installing the second subscriber identity module based on the received subscriber identity module installation data.

In Example 22, the subject matter of Example 21 can optionally include that receiving the instruction comprises receiving the instruction using a Near Field Communication receiver.

In Example 23, the subject matter of any one of Examples 21-22 can optionally include that transmitting the request comprises transmitting the request using at least one of a cellular mobile radio communication transmitter, a WLAN transmitter, a transmitter of an ethernet card, a transmitter of an interface card, or a core network transmitter.

In Example 24, the subject matter of any one of Examples 21-23 can optionally include that receiving the subscription data comprises receiving the subscription data using at least one of a cellular mobile radio communication receiver, a WLAN receiver, a receiver of an ethernet card, a receiver of an interface card, or a core network receiver.

In Example 25, the subject matter of any one of Examples 21-24 can optionally include: controlling a subscriber identity module circuit.

In Example 26, the subject matter of Example 25 can optionally include that installing the second subscriber identity module comprises installing the second subscriber identity module in the subscriber identity module circuit.

In Example 27, the subject matter of any one of Examples 21-26 can optionally include: receiving event data from the second mobile radio communication device; wherein receiving the instruction comprises receiving the instruction from the second mobile radio communication device based on the event data.

In Example 28, the subject matter of Example 27 can optionally include that receiving the event data comprises receiving the event data using a Near Field Communication receiver.

In Example 29, the subject matter of any one of Examples 21-28 can optionally include that the second server comprises the first server.

In Example 30, the subject matter of any one of Examples 21-29 can optionally include: controlling a processor; wherein controlling the processor comprises receiving the receiver and installing the second subscriber identity module.

Example 31, as described with reference to FIG. 6B, is a method for controlling a first server, the method comprising: receiving from a second mobile radio communication device a request for subscriber identity module installation data for installation of a second subscriber identity module, wherein the second subscriber identity module is related to a first subscriber identity module that is installed in a first mobile radio communication device; and transmitting to a second server a request to transmit the subscriber identity module installation data to the second mobile radio communication device.

In Example 32, the subject matter of Example 31 can optionally include that receiving the request comprises receiving the request using at least one of a cellular mobile radio communication receiver, a WLAN receiver, a receiver of an ethernet card, a receiver of an interface card, or a core network receiver.

In Example 33, the subject matter of any one of Examples 31-32 can optionally include that transmitting the request comprises transmitting the request using a core network transmitter.

Example 34, as described with reference to FIG. 6C, is a method for controlling a second server, the method comprising: receiving from a first server a request to transmit subscriber identity module installation data for installation of a first subscriber identity module to a first mobile radio communication device; and transmitting the subscriber identity module installation data to the first mobile radio communication device.

In Example 35, the subject matter of Example 34 can optionally include that the first subscriber identity module is related to a second subscriber identity module that is installed in a second mobile radio communication device.

In Example 36, the subject matter of any one of Examples 34-35 can optionally include that receiving the request comprises receiving the request using a core network receiver.

In Example 37, the subject matter of any one of Examples 34-36 can optionally include that transmitting the subscription data comprises transmitting the subscription data using a core network transmitter.

Example 38, as described with reference to FIG. 6D, is a method for controlling a server, the method comprising: receiving from a second mobile radio communication device a request for subscriber identity module installation data for installation of a second subscriber identity module, wherein the second subscriber identity module is related to a first subscriber identity module that is installed in a first mobile radio communication device; and transmitting the subscriber identity module installation data to the second mobile radio communication device.

In Example 39, the subject matter of Example 38 can optionally include that receiving the request comprises receiving the request using at least one of a cellular mobile radio communication receiver, a WLAN receiver, a receiver of an ethernet card, a receiver of an interface card, or a core network receiver.

In Example 40, the subject matter of any one of Examples 38-39 can optionally include that transmitting the subscription data comprises transmitting the subscription data using a core network transmitter.

In Example 41 is a mobile radio communication device comprising: an instruction receiving means for receiving an instruction from a second mobile radio communication device to request subscriber identity module installation data for installation of a second subscriber identity module, wherein the second subscriber identity module is related to a first subscriber identity module that is installed in the second mobile radio communication device; a request transmitting means for transmitting a request for the subscriber identity module installation data to a first server; a subscription data receiving means for receiving the subscriber identity module installation data from a second server; and a controlling means for installing the second subscriber identity module based on the received subscriber identity module installation data.

In Example 42, the subject matter of Example 41 can optionally include that the instruction receiving means comprises a Near Field Communication receiver.

In Example 43, the subject matter of any one of Examples 41-42 can optionally include that the request transmitting means comprises at least one of a cellular mobile radio communication transmitter, a WLAN transmitter, a transmitter of an ethernet card, a transmitter of an interface card, or a core network transmitter.

In Example 44, the subject matter of any one of Examples 41-43 can optionally include that the subscription data receiving means comprises at least one of a cellular mobile radio communication receiver, a WLAN receiver, a receiver of an ethernet card, a receiver of an interface card, or a core network receiver.

In Example 45, the subject matter of any one of Examples 41-44 can optionally include: a subscriber identity module means.

In Example 46, the subject matter of Example 45 can optionally include that the controlling means is for installing the second subscriber identity module in the subscriber identity module circuit.

In Example 47, the subject matter of any one of Examples 41-46 can optionally include: a short range receiving means for receiving event data from the second mobile radio communication device; wherein the instruction receiving means is for receiving the instruction from the second mobile radio communication device based on the event data.

In Example 48, the subject matter of Example 47 can optionally include that the short range receiving means comprises a Near Field Communication receiver.

In Example 49, the subject matter of any one of Examples 41-48 can optionally include that the second server comprises the first server.

In Example 50, the subject matter of any one of Examples 41-49 can optionally include: a processing means; wherein the processing means comprises the instruction receiving means and the controlling means.

Example 51 is a first server comprising: a request receiving means for receiving from a second mobile radio communication device a request for subscriber identity module installation data for installation of a second subscriber identity module, wherein the second subscriber identity module is related to a first subscriber identity module that is installed in a first mobile radio communication device; and a request transmitting means for transmitting to a second server a request to transmit the subscriber identity module installation data to the second mobile radio communication device.

In Example 52, the subject matter of Example 51 can optionally include that the request receiving means comprises at least one of a cellular mobile radio communication receiver, a WLAN receiver, a receiver of an ethernet card, a receiver of an interface card, or a core network receiver.

In Example 53, the subject matter of any one of Examples 51-52 can optionally include that the request transmitting means comprises a core network transmitter.

Example 54 is a second server comprising: a request receiving means for receiving from a first server a request to transmit subscriber identity module installation data for installation of a first subscriber identity module to a first mobile radio communication device; and a subscription data transmitting means for transmitting the subscriber identity module installation data to the first mobile radio communication device.

In Example 55, the subject matter of Example 54 can optionally include that the first subscriber identity module is related to a second subscriber identity module that is installed in a second mobile radio communication device.

In Example 56, the subject matter of any one of Examples 54-55 can optionally include that the request receiving means comprises a core network receiver.

In Example 57, the subject matter of any one of Examples 54-56 can optionally include that the subscription data transmitting means comprises a core network transmitter.

Example 58 is a server comprising: a request receiving means for receiving from a second mobile radio communication device a request for subscriber identity module installation data for installation of a second subscriber identity module, wherein the second subscriber identity module is related to a first subscriber identity module that is installed in a first mobile radio communication device; and a subscription data transmitting means for transmitting the subscriber identity module installation data to the second mobile radio communication device.

In Example 59, the subject matter of Example 58 can optionally include that the request receiving means comprises at least one of a cellular mobile radio communication receiver, a WLAN receiver, a receiver of an ethernet card, a receiver of an interface card, or a core network receiver.

In Example 60, the subject matter of any one of Examples 58-59 can optionally include that the subscription data transmitting means comprises a core network transmitter.

Example 61 is a computer readable medium having recorded instructions thereon which, when executed by a processor, make the processor perform a method for controlling a mobile radio communication device comprising: receiving an instruction from a second mobile radio communication device to request subscriber identity module installation data for installation of a second subscriber identity module, wherein the second subscriber identity module is related to a first subscriber identity module that is installed in the second mobile radio communication device; transmitting a request for the subscriber identity module installation data to a first server; receiving the subscriber identity module installation data from a second server; and installing the second subscriber identity module based on the received subscriber identity module installation data.

In Example 62, the subject matter of Example 61 can optionally include that receiving the instruction comprises receiving the instruction using a Near Field Communication receiver.

In Example 63, the subject matter of any one of Examples 61-62 can optionally include that transmitting the request comprises transmitting the request using at least one of a cellular mobile radio communication transmitter, a WLAN transmitter, a transmitter of an ethernet card, a transmitter of an interface card, or a core network transmitter.

In Example 64, the subject matter of any one of Examples 61-63 can optionally include that receiving the subscription data comprises receiving the subscription data using at least one of a cellular mobile radio communication receiver, a WLAN receiver, a receiver of an ethernet card, a receiver of an interface card, or a core network receiver.

In Example 65, the subject matter of any one of Examples 61-64 can optionally include recorded instructions thereon which, when executed by a processor, make the processor perform: controlling a subscriber identity module circuit.

In Example 66, the subject matter of Example 65 can optionally include that installing the second subscriber identity module comprises installing the second subscriber identity module in the subscriber identity module circuit.

In Example 67, the subject matter of any one of Examples 61-66 can optionally include recorded instructions thereon which, when executed by a processor, make the processor perform: receiving event data from the second mobile radio communication device; wherein receiving the instruction comprises receiving the instruction from the second mobile radio communication device based on the event data.

In Example 68, the subject matter of Example 67 can optionally include that receiving the event data comprises receiving the event data using a Near Field Communication receiver.

In Example 69, the subject matter of any one of Examples 61-68 can optionally include that the second server comprises the first server.

In Example 70, the subject matter of any one of Examples 61-69 can optionally include recorded instructions thereon which, when executed by a processor, make the processor perform: controlling a processor; wherein controlling the processor comprises receiving the receiver and installing the second subscriber identity module.

Example 71 is a computer readable medium having recorded instructions thereon which, when executed by a processor, make the processor perform a method for controlling a first server comprising: receiving from a second mobile radio communication device a request for subscriber identity module installation data for installation of a second subscriber identity module, wherein the second subscriber identity module is related to a first subscriber identity module that is installed in a first mobile radio communication device; and transmitting to a second server a request to transmit the subscriber identity module installation data to the second mobile radio communication device.

In Example 72, the subject matter of Example 71 can optionally include that receiving the request comprises receiving the request using at least one of a cellular mobile radio communication receiver, a WLAN receiver, a receiver of an ethernet card, a receiver of an interface card, or a core network receiver.

In Example 73, the subject matter of any one of Examples 71-72 can optionally include that transmitting the request comprises transmitting the request using a core network transmitter.

Example 74 is a computer readable medium having recorded instructions thereon which, when executed by a processor, make the processor perform a method for controlling a second server comprising: receiving from a first server a request to transmit subscriber identity module installation data for installation of a second subscriber identity module to a second mobile radio communication device; and transmitting the subscriber identity module installation data to the second mobile radio communication device.

In Example 75, the subject matter of Example 74 can optionally include that the second subscriber identity module is related to a first subscriber identity module that is installed in a first mobile radio communication device.

In Example 76, the subject matter of any one of Examples 74-75 can optionally include that receiving the request comprises receiving the request using a core network receiver.

In Example 77, the subject matter of any one of Examples 74-76 can optionally include that transmitting the subscription data comprises transmitting the subscription data using a core network transmitter.

Example 78 is a computer readable medium having recorded instructions thereon which, when executed by a processor, make the processor perform a method for controlling a server comprising: receiving from a second mobile radio communication device a request for subscriber identity module installation data for installation of a second subscriber identity module, wherein the second subscriber identity module is related to a first subscriber identity module that is installed in a first mobile radio communication device; and transmitting the subscriber identity module installation data to the second mobile radio communication device.

In Example 79, the subject matter of Example 78 can optionally include that receiving the request comprises receiving the request using at least one of a cellular mobile radio communication receiver, a WLAN receiver, a receiver of an ethernet card, a receiver of an interface card, or a core network receiver.

In Example 80, the subject matter of any one of Examples 78-79 can optionally include that transmitting the subscription data comprises transmitting the subscription data using a core network transmitter.

Various aspects of this disclosure provide an architecture and solution of Virtual SIM(vSIM) for smart devices which aims to replace the current conventional UICC (U/SIM Card) with a secure element. The secure element may be either embedded into the modem directly or in a dedicated secure engine (such as an embedded UICC [eUICC]) hosting the (U)SIM as part of the platform. The Virtual SIM may exhibit the same behavior and functionality as the current UICC, just running the software version of the (U)SIM with minimal or no changes to the existing SIM-modem interaction. It may provide interoperability between the (U)SIM and a cellular modem/ME (Mobile Equipment) independently of the manufacturer, card issuer or operator, proving easy and fast acceptance and adoption of proposed system. It is to be noted that by hosting the SIM outside the UICC, various aspects of this disclosure do not compromise the security aspects related to the SIM.

Various aspects of this disclosure provide a multiple persona management system via different mobile subscriptions to be hosted on the same secure element. This may allow downloading multiple subscriptions not only from the same MNO but also from different MNOs and also provides the management (activation, switching, and deletion) of the subscriptions on the Virtual SIM. Various aspects of this disclosure provide a solution of enabling secure isolated virtual containers to host multiple virtual SIMs on the same secure element hosted on the platform or the cellular modem.

Various aspects of this disclosure introduce a concept of combining the power of using other radio communication mechanisms like NFC services (which may allow the smart devices to read and write a contactless card, act like a contactless card and connect securely to other NFC enabled smart devices to exchange data) along with the trusted secure element hosting the vSIM with a standardized generic interface (e.g. Single Wire Protocol) architecture. This allows the user to "TAP and ACTIVATE" or "DOUBLE TAP and DEACTIVATE" subscriptions on other smart devices equipped with the capability of embedded secure element hosting the Virtual SIM.

Various aspects of this disclosure provide an Ultra-Mobility Server as new network element to manage the services and subscriptions related to a subscriber.

Various aspects of this disclosure may enhance user experience by providing a secure execution environment that stores the user's persona via his subscription information. Various aspects of this disclosure may provide ease of remote subscription management, i.e. installation, replacement and termination of subscriptions. Various aspects of this disclosure may provide, once installed, 'easy-to-use' subscription management (see example 'Tap and Activate').

This may allow the user to seamlessly choose connectivity to the world wide web and its digital data on-the-go, anytime and anywhere.

Many smart devices today are equipped with Near Field Communication (NFC) technology. Also platforms are getting more secure with variants of Trusted Execution environment (TEE) being provisioned in them (e.g. Trusted Platform Module, ARM TrustZone, etc.). Various aspects of this disclosure introduce the concept of combining the power of using NFC services (which allows the smart devices to read and write a contactless card, act like a contactless card and connect securely to other NFC enabled smart devices to exchange data) along with the trusted secure element to provide a Single Wire Protocol (SWP) architecture hosted on the same Java Card.

In the following, a use case scenario according to various aspects of this disclosure will be described.

A mobile network operator may provide the option for the subscriber to purchase a "X GB" mobile data plan with the option to connect up to "Y connected" devices. The key devices may be smartphones, Ultrabooks and tablets. The user on purchase of a subscription (from a store) may use his smartphone with NFC capability or with an NFC card with integrated UICC functionality referenced as the "primary device" to first be loaded with a subscription from the plan and also be the identifier for the plan.

The smartphone (or the NFC card) may be equipped with the Trusted Execution Environment (or Secure Chip) that hosts the virtual SIM.

This primary device may also run the "Tap App" user application which may allow the user to get to know his plan details with a single click of the button. This primary device may be then used for activating subscriptions on other "secondary" devices described in the usage scenario below.

For example, the primary device may be a smartphone (for example with 3G/LTE modem, NFC card and TEE). For example, the secondary device may be an Ultrabook (for example with 3G/LTE modem, NFC card and TEE).

For example, a usage scenario may be as follows:

1. A user may receive a first subscription for his data plan on his smartphone by means of a single tap using a Master device with an NFC card at the telecom shop, or he may already get the smartphone provisioned with the subscription at the store. If a Master device is used, the sales person at the telecom shop may need to confirm the activation through the user interface of the Master device.

2. When the user wishes to activate a secondary device e.g. Ultrabook, the User may tap the Ultrabook with the smartphone (for NFC communication between the devices) to activate a second subscription from his data plan.

3. The user may double tap the Ultrabook with the smartphone to remove a subscription. The user may need to confirm the removal through the user interface of the primary device.

4. Only the primary device or the Master device may be able to provide the confirmation for activating and removing subscriptions.

Figure 7:
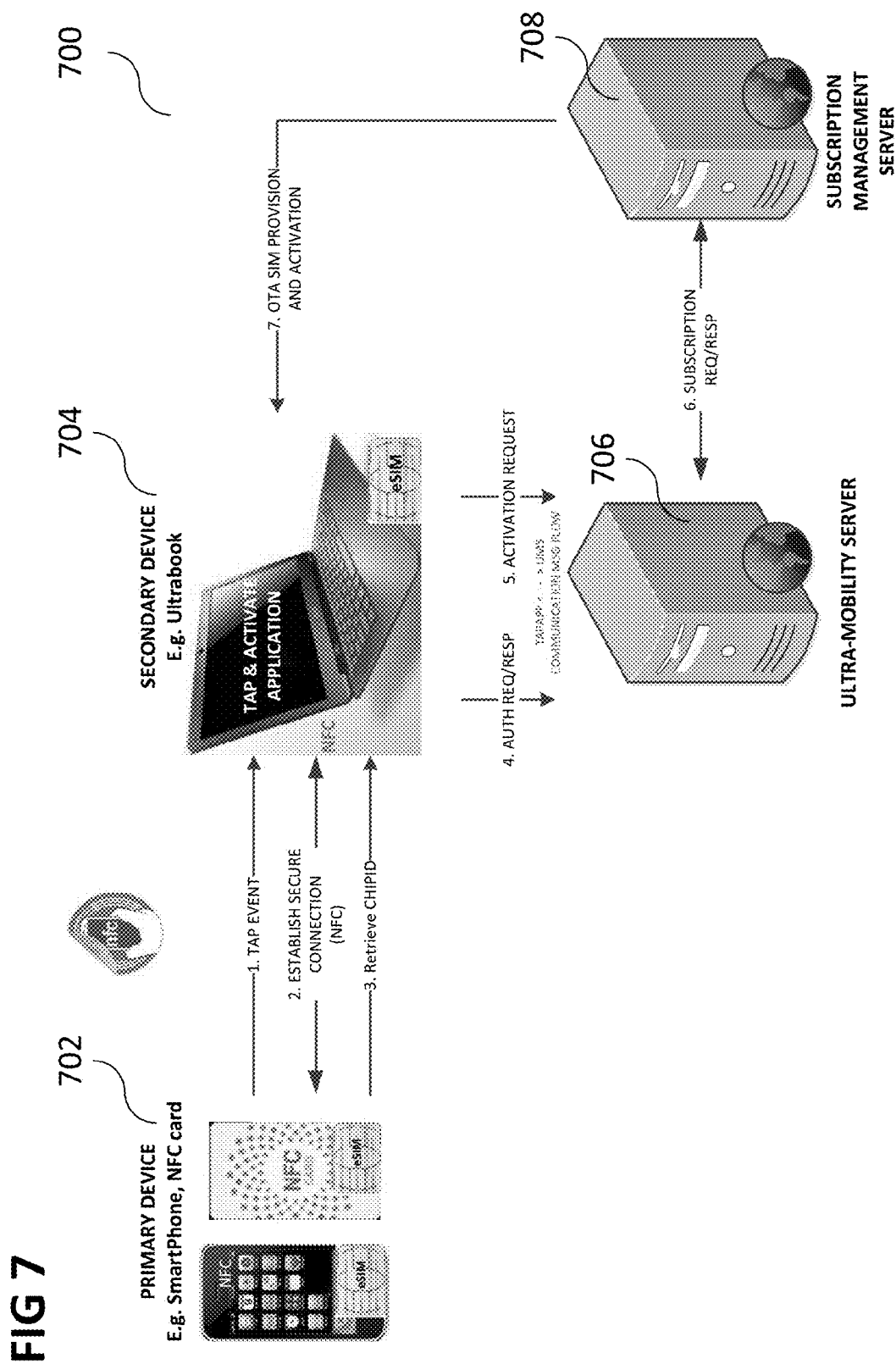
FIG. 7 shows an illustration of an architecture and message flow for a "Tap and Activate" procedure.

FIG. 7 shows an illustration 700 of an architecture and message flow for the "Tap and Activate" procedure including a primary device 702, a secondary device 704, an Ultra-Mobility Server 706, and a Subscription Management Server 708. FIG. 7 depicts the above mentioned steps along with the events:

1. When the user taps the secondary device with the primary device, the NFC applet of the primary device may signal a TAP event to the NFC applet of the secondary device.

2. A secure connection may be established between the two NFC applets.

3. The NFC applet of the secondary device may retrieve the ChipID1 of the UICC storing the SIM of the primary device, the UserID1 of the primary device, and a one-time password (OTP) from the primary device. The user may need to confirm through the user interface of the primary device that it is allowed to provide an OTP. The UserID1 may be a unique identifier for the primary device. E.g. the UserID may be derived from the International Mobile Equipment Identity (IMEI) of the device.

4. The secondary device may authenticate itself towards the Ultra-Mobility Server (UMS) by providing the UserID1 of the primary device and the OTP. Upon successful verification of the OTP provided for UserID1 the UMS may indicate to the secondary device that the authentication was successful.

5. The secondary device may send a request to the UMS to provide subscription data for installation of a subscriber identity module on the secondary device and to activate the subscription in the network. With the request the secondary device may send the UserID1 and the ChipID1 of the primary device, and its own UserID2 and ChipID2. UserID2 may be a unique identifier for the secondary device, and ChipID2 may be the identity of the UICC of the secondary device on which the new SIM is to be installed.

The UMS may retrieve the subscriber data stored for UserID1, e.g. the maximum number of allowed subscriptions and the number of currently activated subscriptions, and may check whether the user is allowed to perform the requested action, in this case to download and activate another SIM.

6. If the number of subscriptions that are already active is smaller than the maximum number permitted by the user's data plan, the UMS may send a request to the to the Subscription Management Server (SubMan) to provide subscription data for installation of a subscriber identity module on the secondary device and to activate the subscription in the network. The request may include the Pool-ID, the ChipID2, and the address Addr2 under which the SubMan can reach the secondary device, for example an IP address. After successful completion of the requested actions the SubMan may send a confirmation to the UMS. The Pool-ID may refer to a pool of subscriptions that have been reserved on the SubMan for the UMS and from which the requested subscription is selected. Dependent on the configuration, the Pool-ID may also be considered as a UMS identifier; but generally a UMS may request subscriptions from more than one Pool-ID on a SubMan and, if more than one UMS is deployed, several UMSs may request subscriptions from the same pool on the SubMan. The UMS may either extract the Addr2 in step 5 from the source address information of the HTTP request from the secondary device, or alternatively the secondary device may send the Addr2 to the UMS as a separate parameter within the HTTP request.

7. The Subman may assign a new subscription for ChipID2 and Addr2, transmit the subscription data necessary to install the new subscription on the secondary device 'over-the-air' (OTA) or 'over-the-internet' to the secondary device and activate the subscription in the mobile network.

Figure 8:
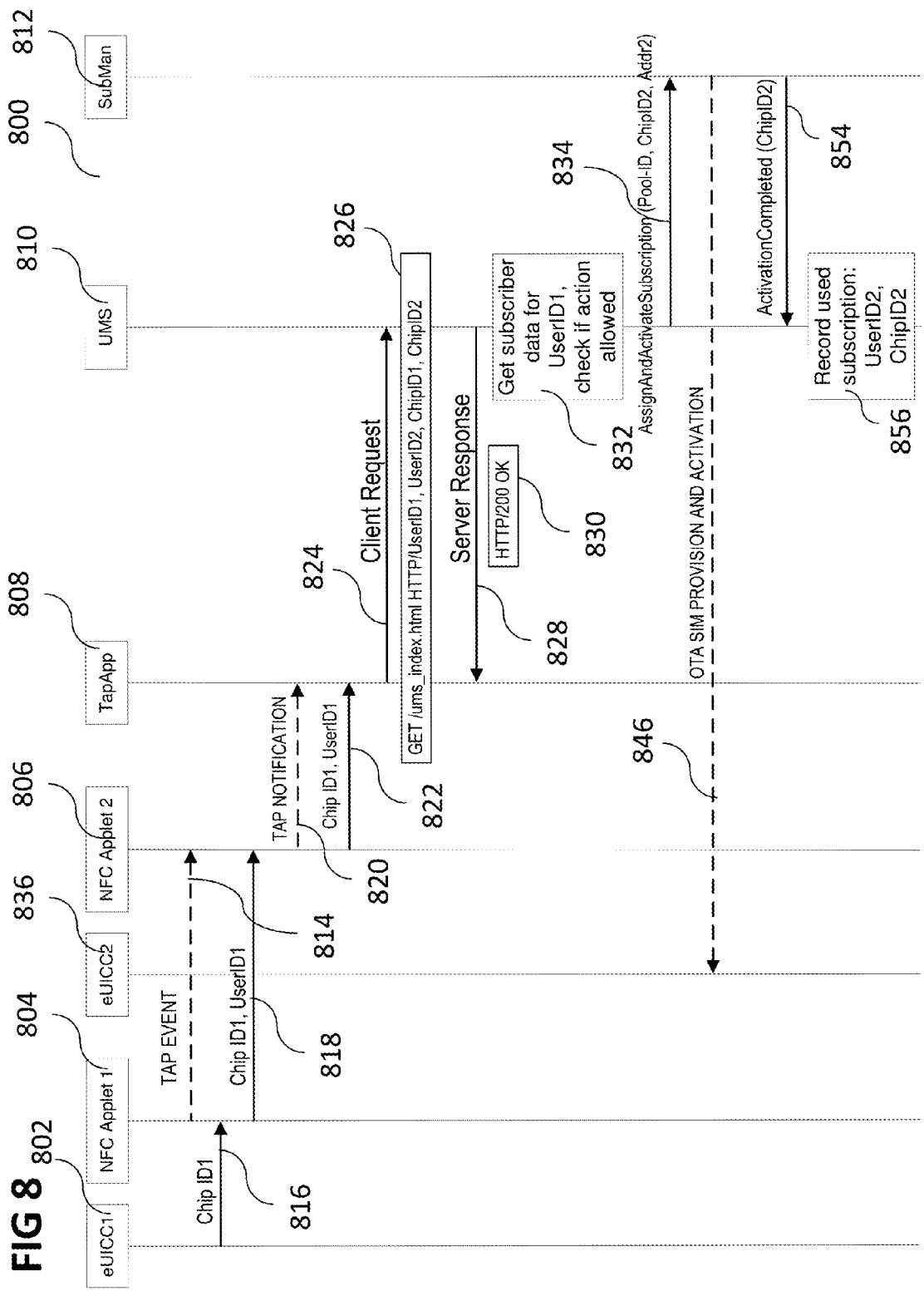
FIG. 8 shows a flow diagram depicting the "Tap and Activate" procedure in more detail.

FIG. 8 shows a flow diagram 800 of a message flow depicting the interaction (which may be referred to as the "Tap and Activate" procedure) between the entities with more details. Communication between a first embedded UICC (eUICC1) 802 and a first NFC applet 804 on a primary device, a second embedded UICC (eUICC2) 836, a second NFC applet 806, and a TapApp (tap application) 808 on a secondary device, an Ultra-Mobility Server (UMS) 810, and a Subscription Management Server (SubMan) 812 are shown.

The user may tap the secondary device with the primary device, and as a consequence the NFC applet 804 of the primary device may signal a TAP event 814 to the NFC applet 806 of the secondary device.

The NFC applet 804 of the primary device may retrieve (in 816) the ChipID1 from the eUICC1 802 of the primary device.

The NFC applet 804 of the primary device may send (in 818) the ChipID1 and the UserID1 of the primary device to the NFC applet 806 of the secondary device.

In 820, the NFC applet 806 of the secondary device may inform the TapApp 808, an application running on the secondary device, about the 'single tap' event by sending a TAP NOTIFICATION message. The TapApp 808 may determine from the type of event ('single tap') that it needs to initiate a procedure to download a new subscription to the secondary device. Therefore, in 822, the TapApp 808 may retrieve the UserID1 and ChipID1 from the NFC applet 806 of the secondary device, together with the UserID2 of the secondary device and the ChipID2 of the eUICC2 836 on which the new subscription is to be stored.

The TapApp 808 may send a client request 824 to the UMS 810. This client request 824 may include an HTTP request 826 to provide subscription data for installation of a subscriber identity module on the secondary device and to activate the subscription in the network. With the request the TapApp 808 may send the UserID1 and the ChipID1 of the primary device, and UserID2 and ChipID2 of the secondary device.

The UMS may respond with a confirmation 828 including a HTTP/200 OK message 830.

In 832, the UMS may retrieve the subscriber data stored for UserID1 and check if the user is allowed to download and activate another SIM.

If the check is successful, the UMS may send a request 834 to the Subscription Management Server (SubMan) 812 to provide subscription data for installation of a subscriber identity module on the secondary device and to activate the subscription in the network. The request 834 may include the Pool-ID of the pool from which the subscription is to be selected, the ChipID2, and the address Addr2 under which the SubMan 812 can reach the secondary device, typically an IP address.

In 846, the Subman 812 may establish a secure connection 'over-the-air' (OTA) or 'over-the-internet' to the eUICC2 836 of the secondary device, transmit the subscription data necessary to install the new subscription on the secondary device, and activate the subscription in the mobile network.

After successful completion of the requested actions the SubMan 812 may send a confirmation 854 to the UMS 810.

In 856, the UMS 810 may record in the database entry for UserID1 that a subscription was downloaded and activated for UserID2 and ChipID2.

In the following, the network side of a subscription management architecture will be described.

The subscription management architecture may be provided as a SaaS (Software as a Service) solution hosted on a computing platform called "Ultra-Mobility Server". This architecture may provide connectivity interface via web-services e.g. REST (Representational State Transfer) API (Application Programming Interface) for client-webserver communication (between Mobile Device and Ultra-Mobility Server), may provide mobile device management via generic methods/API for subscription management and user account management, may host smart brokering algorithms and intelligent billing operations, and may provide REST APIs towards a Subscription Management Server (for example operated by a UICC vendor on behalf of one or several operators) for service activation and de-activation.

In the following, a device side of the subscription management architecture will be described.

Figure 9:
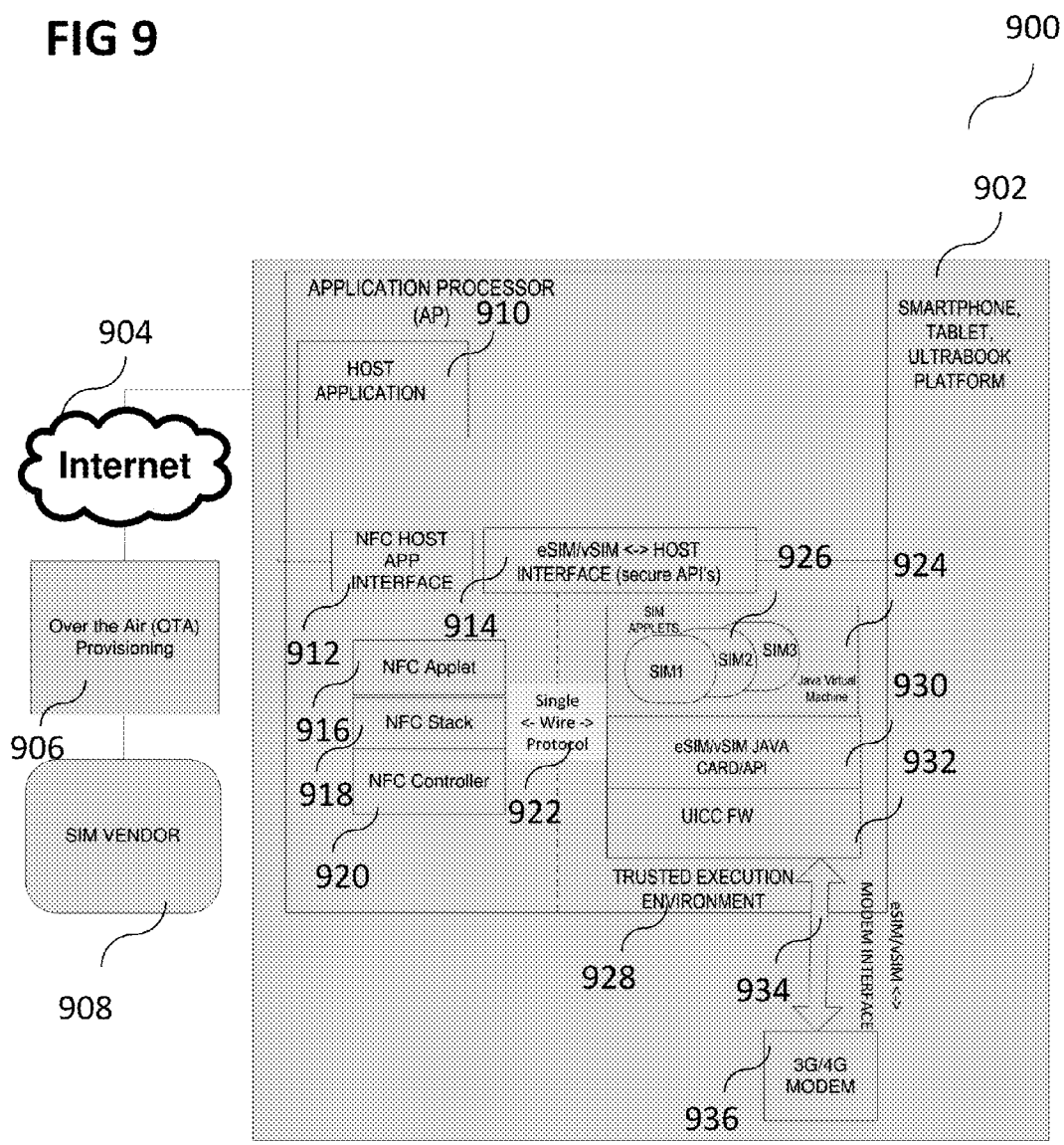
FIG. 9 shows an illustration of a system according to various aspects of this disclosure.

FIG. 9 shows an illustration 900 of a system, including a smartphone, tablet, or Ultrabook platform 902, according to various aspects of this disclosure, including having a trusted execution environment (TEE) 928 on the platform with the ability to host multiple SIMs 926, depicting the interface 934 to the modem 936 along with interface option 914 to the application processor. This depicts a discrete solution hosting the TEE 928 on the platform. There could also be an integrated solution where the TEE 928 is coupled with the 3G/4G modem 936. The TEE 928 hosts a Java Virtual Machine 924 running the Java Card OS hosting the multiple SIM applications 926. The SIM applications 926 may make use of the vSIM Java Card API 930 for protocol communication with the 3G/4G modem 936 via the standard UICC FW 932. The interface 934 between the TEE 928 and 3G/4G modem 936 could be a standardized interface or could be a generic interface such as I2C, UART, SPI etc. The TEE 928 may conform to the minimum set of attributes specified by ETSI (European Telecommunications Standards Institute) for SIM card. The NFC components namely the NFC applet 916, NFC Stack 918, and NFC controller 920 may also be hosted on the platform. The NFC applet 916 may communicate with the TEE 928 via the Single Wire Protocol 922 to get the Chip ID and may pass it to the NFC of the second device upon NFC Tap Event. Both the NFC component and the TEE 928 may communicate with the Host Application 910 via the NFC-Host App interface 912 and eSIM-Host Interface 914 respectively. The TEE 928 may further include UICC FW (firmware) 932. The host application 910 may communicate with a SIM vendor 908 via the internet 904 and an over the air (OTA) provisioning 906.

The platform may also be equipped with a Near Field Communication (NFC) controller 920 communicating with the trusted secure element 928 via a standardized interface 922 (e.g. Single Wire Protocol).

FIG. 9 shows an example architecture of a smartphone, tablet or Ultrabook platform, including a vSIM in a Trusted Execution Environment and an NFC controller.

A trusted secure element on the platform may provide the root of trust for hosting digital signatures, security keys and subscription information. It may provide multiple secure containers hosting isolated SIM subscriptions thus enabling management of multiple SIM cards from different MNOs. It may run the security algorithms (e.g. Milenage). It may also perform cryptographic operations providing security for accessing the data. Over the Air (OTA) may be used for provisioning personalization and activation of SIM cards in mobile devices.

Figure 10:
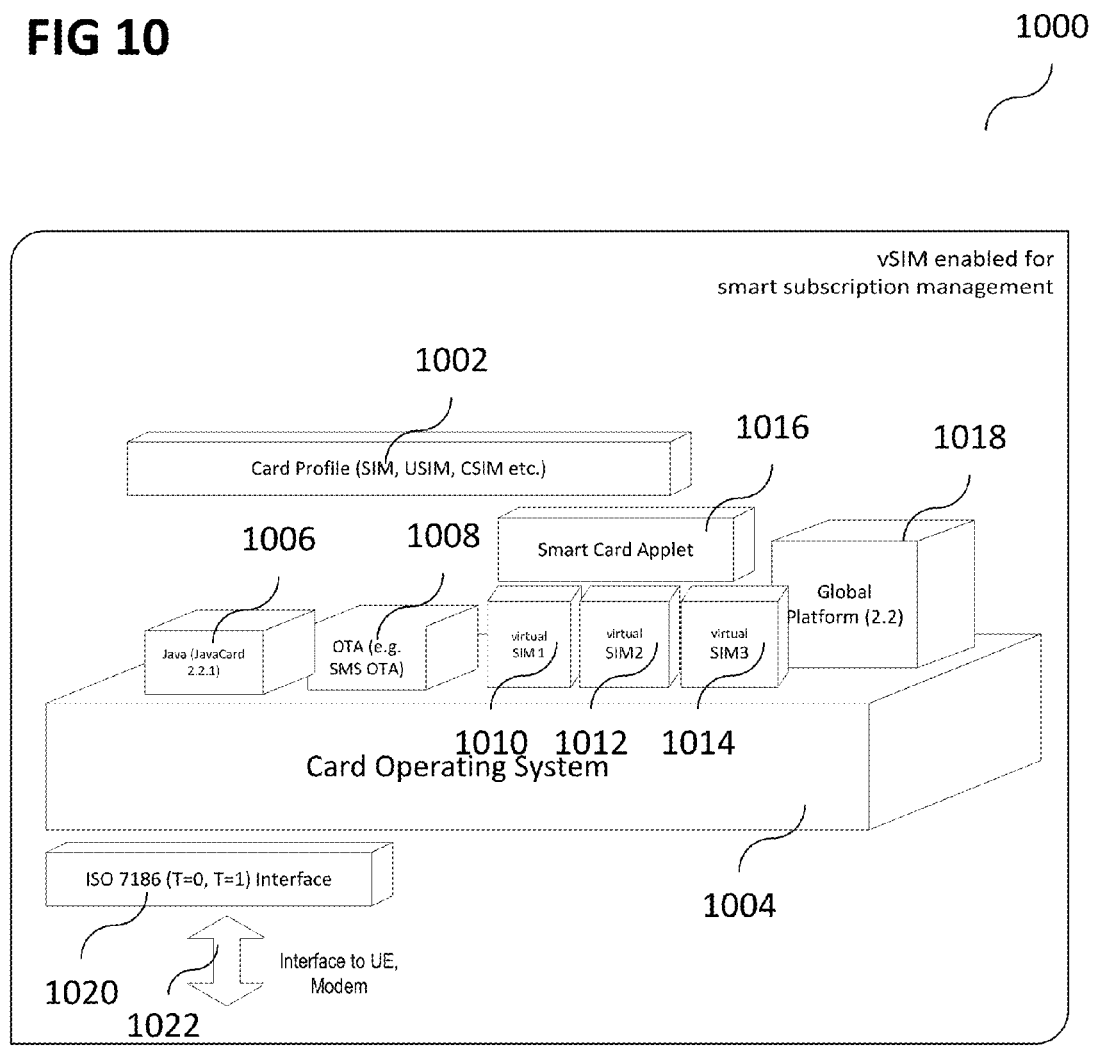
FIG. 10 shows an example architecture 1000 of a vSIM (virtual subscriber identity module) inside a TEE (trusted execution environment).

FIG. 10 shows an example architecture 1000 of the vSIM inside the TEE (trusted execution environment). The TEE stores securely the application namely the SIM, USIM, CSIM 1002 that allows the phone to connect to a mobile network. These applications make it possible for the same smart card to give access to both GSM and UMTS networks, and also provide storage of a phone book and other applications. A Smart Card applet 1016 may be a run time object that provides basic features for operation of the TEE such as communicating with the 3G/4G modem via the ISO 7816 interface 1022 and protocol 1020. The card operating system 1004 runs the Java card virtual machine 1006 that provides the runtime environment for activation and downloading of applications and also for low level communication. The card operating system 1004 may also provide the SIM application toolkit that allows for OTA 1008 (over the air) download (for example SMS OTA download). The card operation system may also contain software packages related to security and cryptography, collectively denoted as global platform 1018. A plurality of virtual subscriber identity modules virtual SIM1 1010, virtual SIM2 1012, and virtual SIM3 1014 may be provided.

According to various aspects of this disclosure, NFC and a "Tap App" may be used. A smart user application may provide ease of management. The "Tap App" application (which may be a host application, for example Windows 8.1 Metro Application, Android Application etc.) may run on the clients (for example on a smart device identified as secondary device). This host application may communicate securely with the Trusted Execution environment via the eSIM-Host interface and with the NFC controller via the NFC-Host App interface, and may establish a secure connection with the Ultra-Mobility Server using client-server web APIs (e.g. REST APIs).

According to various aspects of this disclosure, application software hosted on smartphone operating systems, embedded secure hardware hosting virtual SIM functionality along with the smart Java card applets, and a middle man entity called Ultra-Mobility Server may be provided.

The ease of subscription management like Tap and activate etc. may involve use of radio communication (like NFC) and a secure element hosting multiple SIMs. The devices and methods according to various aspects of this disclosure may allow only the primary device (plan identifier) to host multiple SIMs: it's "original" one, and a second one related to the "X GB" data plan.

The devices and methods according to various aspects of this disclosure may be used in (or with) 3GPP cellular modems.

The devices and methods according to various aspects of this disclosure may provide added revenue stream from MNO (Mobile Network Operator) commissions, Content Providers, ISVs (independent software vendor), Connectivity Service Providers, Credit Card Providers etc.

The devices and methods according to various aspects of this disclosure may accelerate wireless WAN based platforms (such as tablets, smartphones and Ultrabooks) to the market.

The devices and methods according to various aspects of this disclosure may provide a true "Link-Me" & "Free-Me" user experience and Internet of things experience.

The devices and methods according to various aspects of this disclosure may reduce BOM (bill of materials) cost by leveraging trusted platform computing capabilities on smart devices (e.g. by leveraging the Intel Manageability Engine/Converged Security Engine capabilities to host SIM functionality).

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A mobile radio communication device comprising:
an instruction receiver configured to receive an instruction from a primary mobile radio communication device to request subscriber identity module installation data for installation of a second subscriber identity module based on a received event data from the primary mobile radio communication device, wherein the second subscriber identity module is related to a first subscriber identity module installed in the primary mobile radio communication device;
a request transmitter configured to transmit a request for the subscriber identity module installation data to a first server;
a subscription data receiver configured to receive the subscriber identity module installation data from a second server; and
a controller configured to install the second subscriber identity module based on the received subscriber identity module installation data.

2. The mobile radio communication device of claim 1, wherein the instruction receiver comprises a Near Field Communication receiver.

3. The mobile radio communication device of claim 1, wherein the request transmitter comprises at least one of a cellular mobile radio communication transmitter, a WLAN transmitter, a transmitter of an ethernet card, a transmitter of an interface card, or a core network transmitter.

4. The mobile radio communication device of claim 1, wherein the subscription data receiver comprises at least one of a cellular mobile radio communication receiver, a WLAN receiver, a receiver of an ethernet card, a receiver of an interface card, or a core network receiver.

5. The mobile radio communication device of claim 1, further comprising a subscriber identity module circuit.

6. The mobile radio communication device of claim 5, wherein the controller is configured to install the second subscriber identity module in the subscriber identity module circuit.

7. The mobile radio communication device of claim 1, further comprising:
a short range receiver configured to receive event data from the primary mobile radio communication device;
wherein the instruction receiver is configured to receive the instruction from the primary mobile radio communication device based on the event data.

8. The mobile radio communication device of claim 7, wherein the short range receiver comprises a Near Field Communication receiver.

9. The mobile radio communication device of claim 1, wherein the second server comprises the first server.

10. The mobile radio communication device of claim 1, further comprising a processor;
wherein the processor comprises the instruction receiver and the controller.

11. A first server comprising:
a request receiver configured to receive from a secondary mobile radio communication device a request for subscriber identity module installation data for installation of a second subscriber identity module which the secondary mobile radio communication device received from a primary mobile radio communication device based on a received event data from the primary mobile radio communication device,
wherein the second subscriber identity module is related to a first subscriber identity module installed in the primary mobile radio communication device; and a request transmitter configured to transmit to a second server a request to transmit the subscriber identity module installation data to the secondary mobile radio communication device for installation of the second subscriber identity module based on the subscriber identity module installation data.

12. The first server of claim 11, wherein the request receiver comprises at least one of a cellular mobile radio communication receiver, a WLAN receiver, a receiver of an ethernet card, a receiver of an interface card, or a core network receiver.

13. The first server of claim 11,
wherein the request transmitter comprises a core network transmitter.

14. A second server comprising: a request receiver configured to receive from a first server a request to transmit subscriber identity module installation data for installation of a second subscriber identity module to a secondary mobile radio communication device which the mobility server received from the secondary mobile communication device and the secondary mobile communication device received from a primary mobile radio communication device based on a received event data from the primary mobile radio communication device,
wherein the second subscriber identity module is related to a first subscriber identity module installed in the primary mobile radio communication device; and a subscription data transmitter configured to transmit the subscriber identity module installation data to the secondary mobile radio communication device for installation of the second subscriber identity module based on the subscriber identity module installation data.

15. The second server of claim 14,
wherein the request receiver comprises a core network receiver.

16. The second server of claim 14,
wherein the subscription data transmitter comprises a core network transmitter.

17. A server comprising:
a request receiver configured to receive from a secondary mobile radio communication device a request for subscriber identity module installation data for installation of a second subscriber identity module which the secondary mobile radio communication device received from a primary mobile radio communication device based on a received event data from the primary mobile radio communication device,
wherein the second subscriber identity module is related to a first subscriber identity module installed in the primary mobile radio communication device; and a subscription data transmitter configured to transmit the subscriber identity module installation data to the secondary mobile radio communication device for installation of the second subscriber identity module based on the subscriber identity module installation data.

18. The server of claim 17,
wherein the request receiver comprises at least one of a cellular mobile radio communication receiver, a WLAN receiver, a receiver of an ethernet card, a receiver of an interface card, or a core network receiver.

19. The server of claim 17,
wherein the subscription data transmitter comprises a core network transmitter.

* * * * *